March 4, 1969    L. F. RICHARDSON ET AL    3,430,443
LIQUID FUEL COMBUSTION APPARATUS FOR GAS TURBINE ENGINES
Filed Feb. 17, 1967

Inventors
LESLIE FREDERICK RICHARDSON
AND
DAVID HARDING PARNELL
By
Attorney

United States Patent Office 3,430,443
Patented Mar. 4, 1969

3,430,443
LIQUID FUEL COMBUSTION APPARATUS FOR GAS TURBINE ENGINES
Leslie Frederick Richardson and David Harding Parnell, Bristol, England, assignors to Bristol Siddeley Engines Limited, Bristol, England, a British company
Filed Feb. 17, 1967, Ser. No. 616,981
Claims priority, application Great Britain, Feb. 21, 1966, 7,527/66
U.S. Cl. 60—39.65         6 Claims
Int. Cl. F02c 3/24; F23c 7/00; F23m 9/00

ABSTRACT OF THE DISCLOSURE

A combustion apparatus for a gas turbine engine has a combustion chamber, from an upstream end of which projects a duct within the chamber, the duct receiving air and vaporized fuel, and having, at its outlet, structure which positively deflects the air-fuel mixture in a direction which has an upstream component towards the end wall, and has a radial component. The end wall of the chamber is shaped so that, when the mixture encounters it, it is caused to flow into two vortices, the first of which is small and circulates within the confined space between the duct wall and the upstream end wall and constitutes a pilot vortex, and the second vortex passing into the combustion zone.

---

This invention relates to combustion apparatus for gas turbine engines, the apparatus being of the type in which liquid fuel being delivered to a combustion chamber is discharged in spray form for combustion in the chamber.

According to the present invention such apparatus comprises a combustion chamber having an upstream end wall and a duct which projects downstream from an inlet in the end wall, the duct being arranged to receive air through the inlet and also fuel from a spray burner at the inlet, and the duct having a means adjacent to its outlet for imparting a swirl to the air and fuel mixture, and the duct wall and the chamber end wall defining between them a sheltered zone for accommodating a toroidal pilot vortex which is formed by part of the air/fuel mixture when it is emitted from the duct, which part of the emitted mixture has a radial outward component of motion because of the centrifugal effect of the swirl and is deflected by a wall of the chamber to flow upstream and then downstream past the duct.

The chamber can be annular in form, in which case the inlet and the duct are also annular, the swirl being about the axis of the annulus which can be the axis of the engine generally, and the two pilot vortices are then toroidal about the same axis.

Alternatively, the chamber can be tubular, forming one of a ring of similar chambers mounted around the engine axis.

In this latter case the inlet and the duct of each chamber are symmetrical about the axis of the chamber, and the pilot vortex is toroidal about the same axis.

Preferably the apparatus further has a centrebody having a nose portion which projects upstream to be impinged upon by fuel discharged from the burner.

Preferably the centrebody has an annular peripheral portion which curves upstream to overlap the outside of the duct and forms therewith an annular nozzle which discharges the mixture upstream with a radial outward component of motion.

A further preference is that vanes which support the centrebody from the duct also serve as the means for imparting swirl to the mixture.

Figure 1:
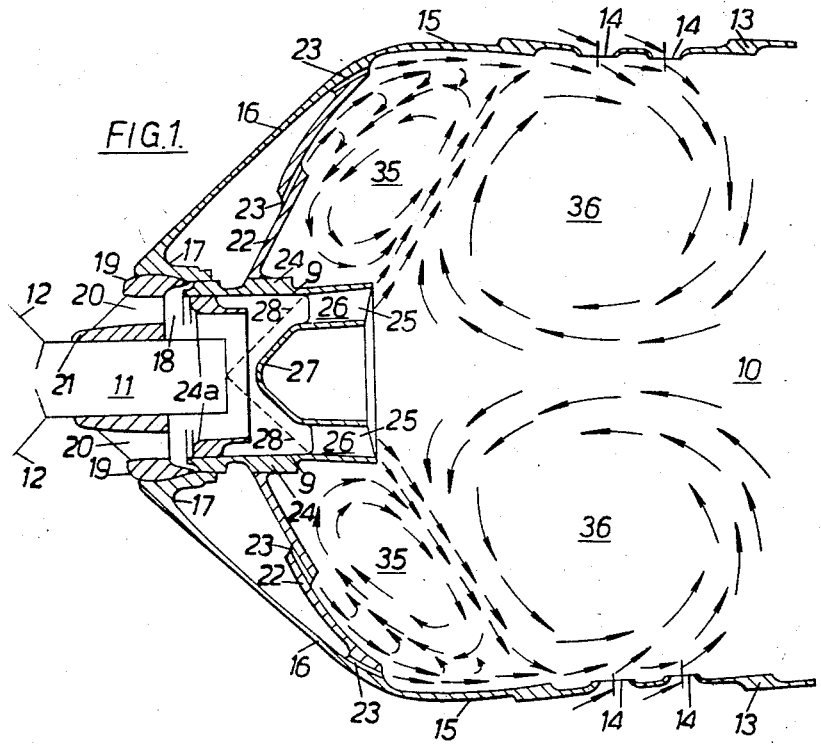
Figure 2:
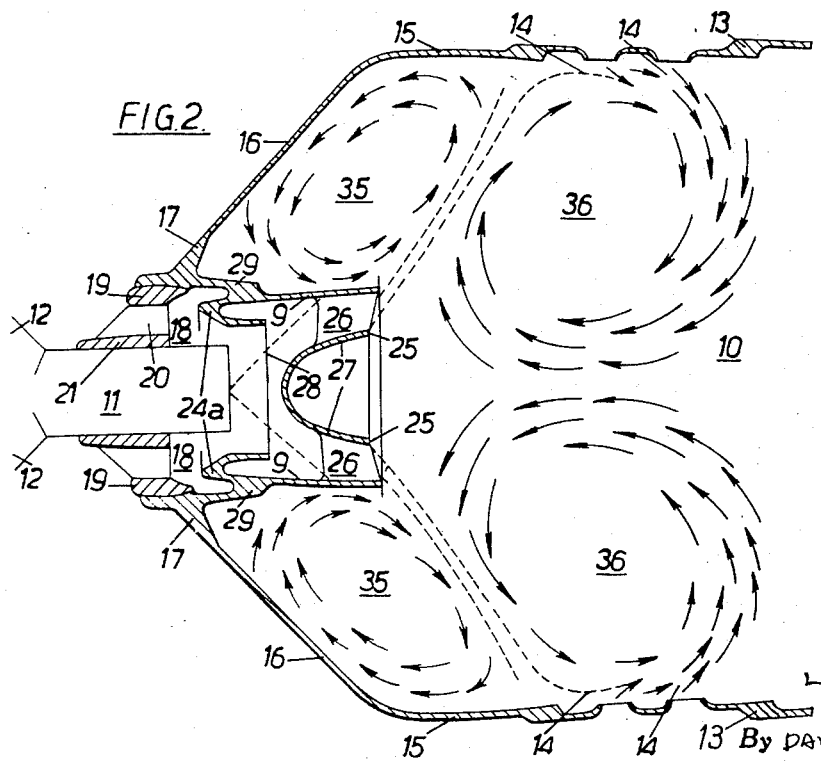
Figure 3:
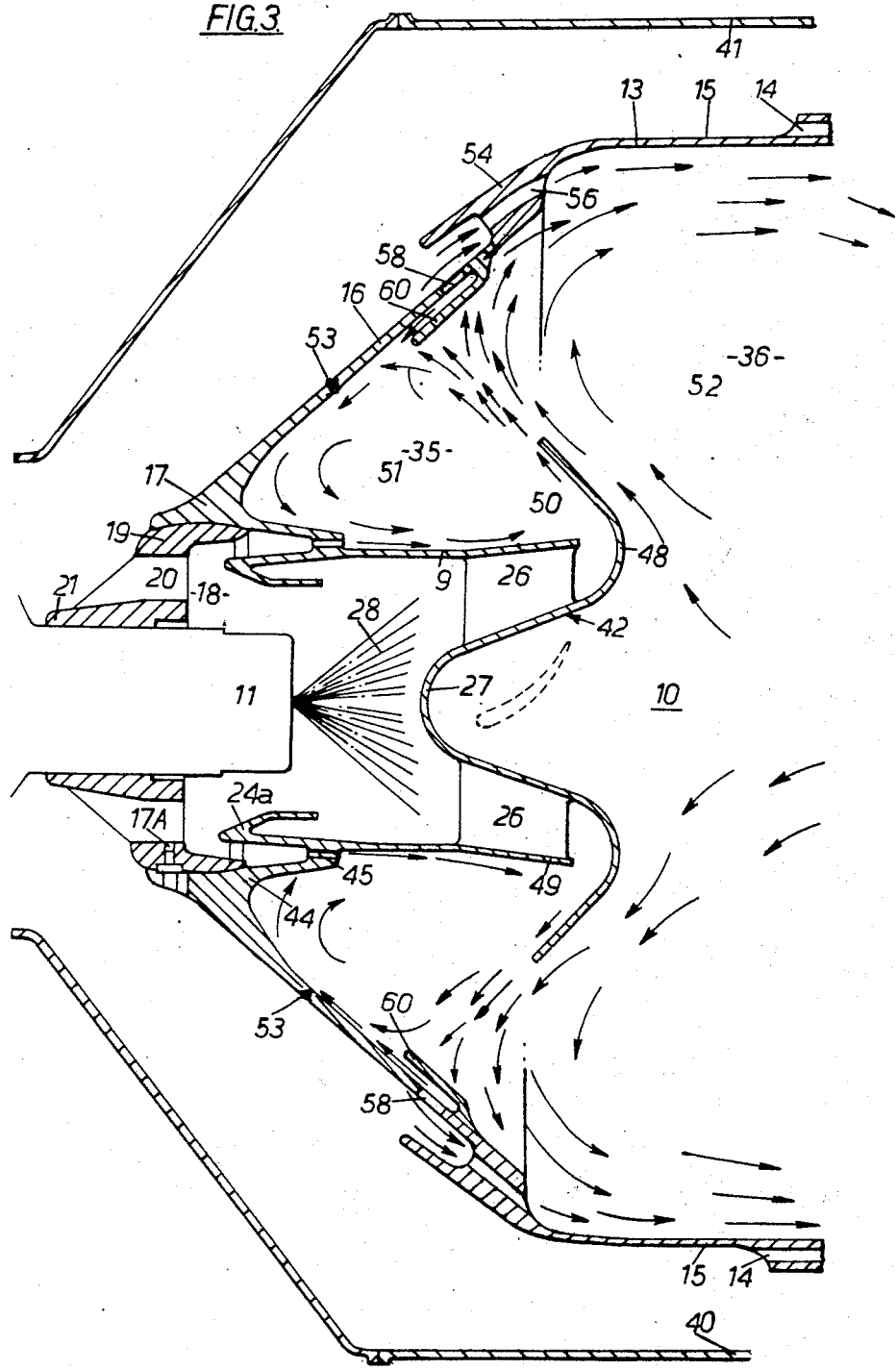

Three embodiments of this invention are described below with reference to the accompanying drawings in which:

FIGURES 1 and 2 are diagrammatic longitudinal half-sections through the upstream portion of two types of combustion chamber for a gas turbine engine; and FIGURE 3 is a longitudinal section through an upstream portion of another combustion chamber.

The description and drawings for ease, may in instances refer to and show merely the tubular form of the chamber, but this is to avoid repetition of the reference to the annular form of the chamber. It is to be understood that the drawings are diagrammatic in that they are each either total sections through a portion of a tubular chamber, or else half of a section through a portion of an annular chamber, the plane of the section in each case including the axis of the chamber. To avoid confusion, many vertical outlines have been omitted from the drawings.

Referring to FIGURES 1 and 2 a combustion chamber 10 is arranged to receive air compressed by a rotary compressor (not shown) and to deliver combustion gas to a turbine arranged to drive the compressor. The chamber is supported at its upstream end on a fuel spray burner 11 and its fuel connector 12 which in turn are supported from the outer wall of the delivery section of the compressor.

The chamber 10 has a main portion 13 which has holes 14 for admitting secondary air into the chamber and an upstream portion 15 which includes an end wall 16 terminating upstream in a central snout 17. The snout 17 is apertured to provide an axial passage 18 for the admission of primary air. A part-spherical bush 19 which is connected by radial vanes 20 to an inner ring 21 mates with a correspondingly shaped wall of the snout 17. The ring 21 is mounted on the burner 11. Inside the chamber, and immediately adjacent to and downstream of the passage 18 is a duct 9.

In FIGURE 1 the chamber 10 includes an inner skin 22 spaced from the end wall 16 and having air passages 23 from directing cooling air along the internal surfaces of the skin 22 and the portion 15. Air is supplied to the passages 23 through holes (not shown) in the end wall 16.

The skin 22 supports a ring 24, the upstream end of which spigots into the snout 17 and presents an annular baffle 24a for imparting a radially inward deflection to the air flowing into the duct 9 in order to promote mixing in the duct of the air and the fuel spray from the burner 11. More importantly, the baffle 24a forms a throat with the casing of the burner 11 to accelerate the flow and so prevent fuel from travelling upstream past the throat and the vanes 20 to where it could burn upstream of the end wall 16 and damage the chamber.

The downstream end of the ring 24 mounts the duct 9 in alignment with passage 18. The duct at its downstream end presents an annular nozzle 25 which has swirl-inducing radial vanes 26. The nozzle has mounted within it a centrebody 27 which projects upstream in the duct, to be impinged upon by a fuel spray 28 from the burner 11. The deflector 25 is mounted within the duct by the vanes 26, which also serve to centrifuge the air/fuel mixture, so that on leaving the nozzle 25 the swirling mixture has a radial outward component of motion, as indicated by the arrows, to form a separate toroidal pilot vortex around the nozzle 25 as well as a main toroidal vortex downstream in the chamber. The swirl vanes deflect the nozzle discharge through about 50° and the small outward inclinations of the nozzle walls assist the deflection.

FIGURE 2 differs from FIGURE 1 mainly in that there is no inner skin 22, no holes formed in the end wall 16, other than the passage 18, and the duct 9 is supported entirely from the snout 17. Also a ring of axial passages can be formed in a rear radial flange 29 of the snout 17 to receive and direct cooling air from the passage 18 rearwards along the outer surface of the outer wall of the duct 9; such passages are seen as 45 in FIGURE 3.

Referring to FIGURE 3, which shows a combustion chamber 10 lying within the inner and outer walls 40, 41 of an annular air casing, the arrangement differs mainly from that shown in FIGURE 2 in that a flow-reversing deflector plate 42, of generally W-section is mounted on the downstream end of the duct 9. The duct 9 has an external bracket 44 which is welded to the downstream end of the snout 17 to hold the duct 9 in position. The vanes 20 are swirl vanes. The bracket has axial passages 45 for discharging cooling primary air over the exterior surface of the duct 9. The flow of primary air past the vanes 20 is divided by the upstream end of the duct into a minor outer flow which is led to the passages 45 and a major inner flow which enters the duct 9 and is deflected inwards by the annular baffle 24a towards the discharge orifice of the burner 11. A radial locking pin 17a prevents rotation of the chamber on the bush 19.

The downstream end of the duct carries radial swirl vanes 26, and through them the flow-reversing deflector plate 42. The vanes are cambered, have a large chordwise dimension, and are inclined at about 50° to provide the necessary swirl. One vane is seen in section, dotted in the appropriate position on FIGURE 3. The deflector plate 42 has a centrebody portion 27 which extends into the duct to lie within the spray cone of the burner 11 and an annular flow-reversing peripheral portion 48 which curves around and overlaps, the adjacent end portion 49 of the duct. The end portion 49 of the duct is of enlarged diameter to provide the required outlet area between the duct and the centre portion 27 without increasing the axial projection of the duct and the deflector plate unit into the chamber 10. The portions 48 and 49 define an annular nozzle which faces upstream and is adjacent to a sheltered corner zone 51. Because of the broad form of the duct 9 and because the deflector plate projects only a short distance into the chamber 10, the vibrational loads on the weld joint 53 between the end wall 16 and the snout 17, which arise from the operating gas pressure on the unit, are correspondingly reduced. In this embodiment having a flow-reversing deflector plate, the outer wall 48 of the nozzle 50 is inclined radially by about 45° to ensure that a pilot vortex of sufficient volume is obtained.

The wall 16 is joined to the wall 15 by a ring 54 which has passages 56. The wall 16 has further openings 58 which are covered by a baffle 60.

In operation, the primary air entering past the vanes 20 is divided by the upstream end of the duct 9 into an outer cooling flow which is led to the passages 45 and an inner flow which enters the tube and is deflected inwards by a baffle 24a towards the centre of the spray discharge from the burner 11. The burner spray impinges on the centrebody 27 and divides, a portion flowing down its diverging sides and forming a film thereon which helps to cool the centrebody, the other portion of the fuel mixing with the air flow. The duct 9 and the deflector plate 42 which become heated by the combustion in the chamber 10, preheat the air/fuel mixture on its way to the nozzle 50, the swirl vanes 26 imparting the necessary swirl to the flow prior to its discharge from the nozzle.

In the embodiments seen in FIGURES 1 and 2, the nozzle discharges the mixture generally downstream. The mixture flows outwards and divides generally into two streams, a minor stream which flows upstream towards the end wall 16 forming eventually a toroidal pilot vortex 35, and a major stream which flows downstream forming eventually a toroidal main vortex 36 of opposite hand.

In the embodiment as seen in FIGURE 3, the nozzle 50 faces generally upstream, and discharges its mixture with a swirl so that the motion of the mixture again has a radial component and divides into two main streams, forming a pilot vortex 35 and a main vortex 36. In this embodiment some of the air flow outside the combustion chamber enters the axial passages 56, to join up with the main vortex in the zone 52, whilst other air passes through the openings 58 and is then deflected by the baffle 60 to flow upstream along the internal surface of the end wall 16 and join up with the flow of the pilot vortex 35 thus both cooling the end wall and energising the pilot vortex. The flare of the portion 48 of the duct is sufficiently great to prevent discharge against the coolant flow emerging from behind the baffle 60.

During engine starting, the pilot vortex 35 forms itself and is then ignited by an adjacent igniter (not shown) whereupon the main vortex 36 ignites. As the engine speed increases, the fuel/air ratio of the mixture discharged from the nozzle 25 (or 50) also increases, and so the pilot vortex which is basically a recirculating flow fed from the nozzle, becomes over-rich in fuel and its flame extinguishes.

If the main vortex becomes extinguished, e.g. following throttling of the engine, the pilot vortex 35 which is no longer over-rich, becomes re-ignited either from the main vortex before the latter ceases to burn or from operation of the igniter and will remain burning even in a weak air/fuel ratio of about 500:1.

It will be seen that the downstream projection of the duct 9 from the end wall 16 ensures the provision of a pilot combustion zone which is large enough to provide adequate residence time for flame propagation and burning in the toroidal pilot vortex and also large enough to delay the formation of an over-rich mixture in the pilot vortex during engine starting until the burning in the main vortex has become stabilised. Flame stabilisation which is also promoted by good fuel distribution is assisted by the presence of the centrebody 27, by the preheating of the air/fuel mixture in contact with the heated wall of the nozzle, and by the swirling motion imparted by the swirl vanes.

Referring to FIGURE 3, it is important that the sheltered zone 51 should be large enough to permit the establishment of a separate pilot vortex of sufficient size. Therefore the nearer the nozzle 50 is to the corner of the snout 17, the greater should be the outward inclination of the nozzle wall 48.

The preheating of the flow inside the duct and its nozzle and the mixing promoted by the presence of the centrebody 27 and swirl vanes 26 permit the use of low pressure burners of the kind associated with so-called "vapourising" burners.

We claim:

1. Combustion apparatus for a gas turbine engine and comprising a combustion chamber to enclose in use a combustion zone, and which has an upstream end wall apertured to provide an inlet for receiving air, a fuel supply means which is also mounted at the inlet, a duct mounted within the chamber extending from the said end wall, the duct having an inlet which receives the air and fuel vaporized from the supply means, and having an outlet downstream of its inlet through which outlet the duct discharges the air/fuel mixture for combustion within the chamber, there being structure mounted at the outlet of the duct, which structure includes means for positively deflecting the mixture to flow in a direction which is both towards the end wall and is radially away from the duct outlet, the end wall having a disposition adapted to divide the discharged fluid upon its encounter with the wall and produce flow thereof into first and second toroidal vortices, the first vortex circulating radially inwards along the end wall and then downstream along the exterior surface of the duct, then radially outwards and upstream with the discharge from the duct, the second vortex having a diameter which is substantially half of the width of the combustion chamber, having a hand opposite to that of the first vortex and lying within the combustion zone of the chamber.

2. Combustion apparatus as claimed in claim 1 in which the structure at the outlet of the duct includes vanes which impart a swirl to the mixture as it discharges from the duct.

3. Combustion apparatus as claimed in claim 1, in which the structure comprises a deflector mounted within the duct and which projects towards the fuel supply means to be impinged upon by fuel discharged therefrom, and an annular peripheral portion which lies spaced apart from but curves around and overlies the outside of the duct outlet and forms therewith an annular nozzle, the periphery of the peripheral portion extending in a radially inclined manner towards the end wall.

4. Combustion apparatus as claimed in claim 1, in which the duct has a convergent-divergent throat upstream of the fuel supply means, through which throat the air has to pass.

5. Combustion apparatus as claimed in claim 1, in which a bypass passage directs cooling air to pass over the external surface of the duct.

6. Apparatus as claimed in claim 1, in which radially outer parts of the end wall are provided with further air inlets and with means for deflecting the air which enters the chamber through the further inlets to cause it to flow inwards across the inner surface of the end wall.

References Cited

UNITED STATES PATENTS

| 2,999,359 | 9/1961 | Murray | 60—39.65 |
| 3,064,424 | 11/1962 | Tomlinson | 60—39.65 |

FOREIGN PATENTS

| 657,789 | 9/1951 | Great Britain. |
| 697,027 | 9/1953 | Great Britain. |

JULIUS E. WEST, *Primary Examiner.*

U.S. Cl. X.R.

60—39.69, 39.71, 39.74